US012381022B2

(12) United States Patent
Watanabe

(10) Patent No.: US 12,381,022 B2
(45) Date of Patent: Aug. 5, 2025

(54) MULTILAYER VARISTOR AND METHOD OF MANUFACTURING THE SAME

(71) Applicant: Panasonic Intellectual Property Management Co., Ltd., Osaka (JP)

(72) Inventor: Michiya Watanabe, Hokkaido (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 393 days.

(21) Appl. No.: 18/065,308

(22) Filed: Dec. 13, 2022

(65) Prior Publication Data

US 2023/0207163 A1 Jun. 29, 2023

(30) Foreign Application Priority Data

Dec. 24, 2021 (JP) ................................ 2021-211591

(51) Int. Cl.

| | |
|---|---|
| ***H01C 7/10*** | (2006.01) |
| ***H01C 1/148*** | (2006.01) |
| ***H01C 7/18*** | (2006.01) |
| ***H01C 17/28*** | (2006.01) |

(52) U.S. Cl.

CPC ............... *H01C 7/10* (2013.01); *H01C 1/148* (2013.01); *H01C 7/18* (2013.01); *H01C 17/281* (2013.01)

(58) Field of Classification Search

CPC . H01C 7/10; H01C 1/148; H01C 7/18; H01C 17/281

See application file for complete search history.

(56) References Cited

U.S. PATENT DOCUMENTS

| | | | | |
|---|---|---|---|---|
| 2003/0043012 A1* | 3/2003 | Shiraishi | H01C 7/102 | 338/21 |
| 2004/0233606 A1* | 11/2004 | Inoue | H01C 7/12 | 361/118 |
| 2007/0091532 A1* | 4/2007 | Yamauchi | H01C 7/18 | 361/118 |
| 2011/0205725 A1* | 8/2011 | Demcko | H01C 1/14 | 361/821 |
| 2020/0194150 A1 | 6/2020 | Uchida | | |

FOREIGN PATENT DOCUMENTS

| | | |
|---|---|---|
| JP | 2015019078 * | 1/2015 |
| JP | 2020-096075 A | 6/2020 |

OTHER PUBLICATIONS

JP2015019078 translation (Year: 2015).*

* cited by examiner

*Primary Examiner* — Kyung S Lee
(74) *Attorney, Agent, or Firm* — Rimon P.C.

(57) ABSTRACT

A sintered body has a first end face and a second end face opposite to each other in a first direction and a first side face and a second side face opposite to each other in a second direction. A first end face electrode is disposed on the first end face except for end portions of the first end face in the second direction. A second end face electrode is disposed on the second end face except for end portions of the second end face in the second direction. A first side face electrode is disposed on the first side face except for end portions of the first side face in the first direction. A second side face electrode is disposed on the second side face except for end portions of the second side face in the first direction.

13 Claims, 7 Drawing Sheets

MULTILAYER VARISTOR AND METHOD OF MANUFACTURING THE SAME

CROSS-REFERENCE TO RELATED APPLICATION

The present application is based upon and claims the benefit of priority to Japanese Patent Application No. 2021-211591 filed on Dec. 24, 2021, the entire contents of which are incorporated herein by reference.

TECHNICAL FIELD

The present disclosure relates to multilayer varistors and methods of manufacturing the multilayer varistors, and specifically, to a multilayer varistor including a plurality of external electrodes and a method of manufacturing the multilayer varistor.

BACKGROUND ART

Literature 1 (JP 2020-096075 A) describes a chip varistor including an element body having a laminated structure, a first conductor, a second conductor, a third conductor, a first electrode, a second electrode, and a third electrode.

The first conductor, the second conductor, and the third conductor are disposed in the element body. The second conductor overlaps the first conductor in a stacking direction of the element body. The third conductor is disposed between the first conductor and the second conductor. A first functional layer is formed between the third conductor and the first conductor, and a second functional layer is formed between the third conductor and the second conductor. The first electrode, the second electrode, and the third electrode are disposed on a surface of the element body. The first electrode is connected to the first conductor. The second electrode is connected to the second conductor. The third electrode is connected to the third conductor.

The chip varistor described in Literature 1 has the problem that parasitic capacitances are generated between the first electrode, the second electrode, and the third electrode (the plurality of external electrodes), and variations in electrostatic capacitance are caused between the plurality of functional layers (varistors).

SUMMARY

In view of the foregoing, it is an object of the present disclosure to provide a multilayer varistor having reduced variations in electrostatic capacitance between a plurality of varistors.

A multilayer varistor according to an aspect of the present disclosure includes a sintered body, a high-resistivity layer, a plurality of internal electrodes, and a plurality of external electrodes. The sintered body has a first end face and a second end face opposite to each other in a first direction, a first side face and a second side face opposite to each other in a second direction intersecting the first direction, and a first main face and a second main face opposite to each other in a third direction intersecting the first direction and the second direction. The high-resistivity layer covers at least part of a surface of the sintered body. The plurality of internal electrodes are disposed in the sintered body. The plurality of external electrodes are disposed on the surface of the sintered body and are electrically connected to the plurality of internal electrodes. The plurality of external electrodes includes a first end face electrode, a second end face electrode, a first side face electrode, and a second side face electrode. The first end face electrode is disposed on the first end face except for end portions of the first end face in the second direction. The second end face electrode is disposed on the second end face except for end portions of the second end face in the second direction. The first side face electrode is disposed on the first side face except for end portions of the first side face in the first direction. The second side face electrode is disposed on the second side face except for end portions of the second side face in the first direction.

A manufacturing method according to an aspect of the present disclosure is a method of manufacturing the multilayer varistor. The manufacturing method includes a forming step of forming the first end face electrode, the second end face electrode, the first side face electrode, and the second side face electrode. In the manufacturing method, the forming step includes applying an electrode material to the surface of the sintered body with a roller to form the first end face electrode, the second end face electrode, the first side face electrode, and the second side face electrode.

BRIEF DESCRIPTION OF THE DRAWINGS

The figures depict one or more implementation in accordance with the present teaching, by way of example only, not by way of limitations. In the figures, like reference numerals refer to the same or similar elements.

DETAILED DESCRIPTION

A multilayer varistor 1 according to an embodiment of the present disclosure will be described in detail with reference to the drawings. Note that the embodiment and variations described below are mere examples of the present disclosure, and the present disclosure is not limited to the embodiment and variations. The present disclosure may be modified variously without departing from the scope of the present disclosure, even if not including the embodiment and variations, according to a design or the like. Further, the embodiment described below (including the variations) may be implemented by appropriately in combination.

(1) Overview

An overview of the multilayer varistor 1 will be described below with reference to FIGS. 1 to 4. Figures described in the following embodiment are schematic views, and the ratio of sizes and the ratio of thicknesses of components in the figures do not necessarily reflect actual dimensional ratios.

Figure 1:
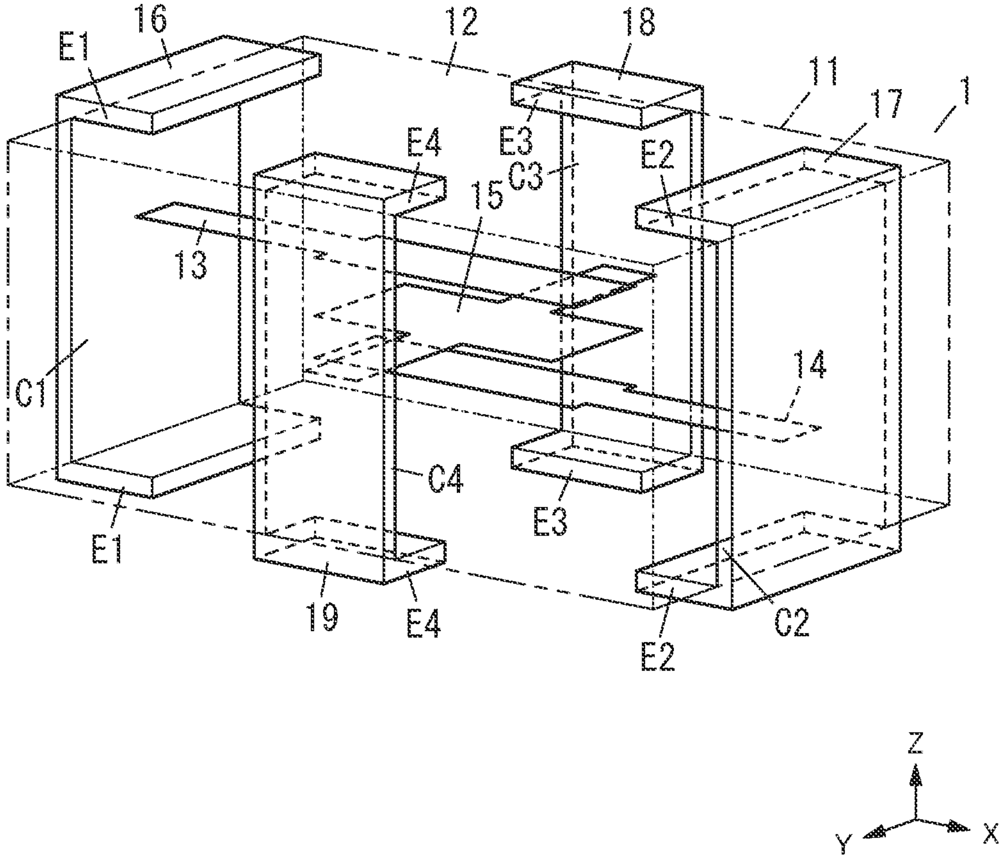
FIG. 1 is a phantom perspective view of a multilayer varistor according to an embodiment of the present disclosure.
Figure 2:
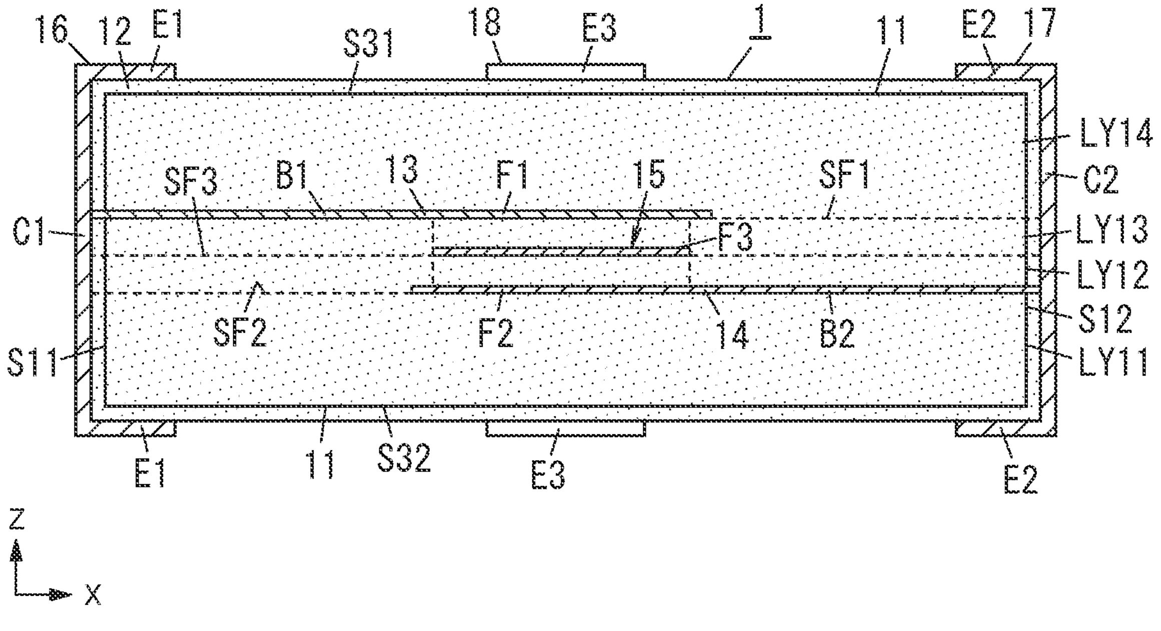
FIG. 2 is a sectional view of the multilayer varistor.
Figure 4:
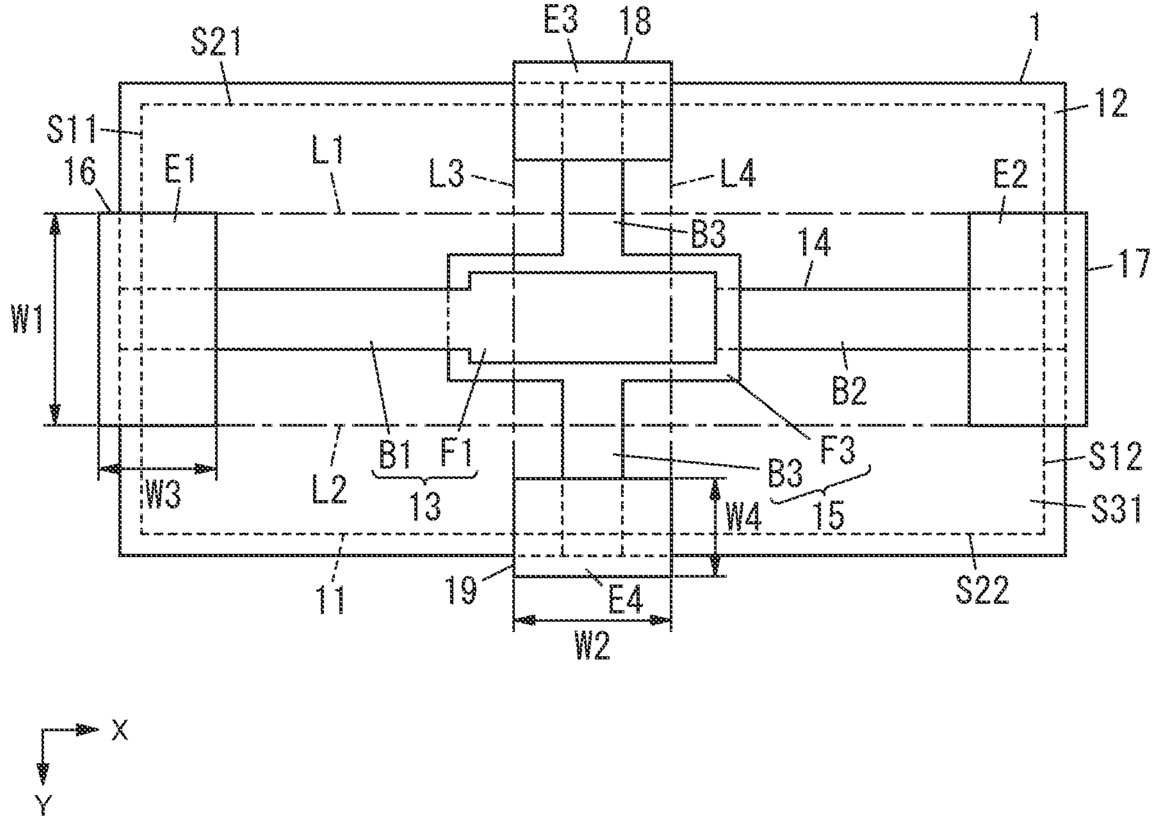
FIG. 4 is a phantom top view of the multilayer varistor.

As shown in FIGS. 1, 2, and 4, the multilayer varistor 1 includes a sintered body 11, a high-resistivity layer 12, a plurality of internal electrodes (a first internal electrode 13, a second internal electrode 14, and a third internal electrode 15), and a plurality of external electrodes.

As shown in FIGS. 2 and 4, the sintered body 11 has a first end face S11 and a second end face S12 opposite to each other in a first direction, a first side face S21 and a second side face S22 opposite to each other in a second direction intersecting the first direction, and a first main face S31 and a second main face S32 opposite to each other in a third direction intersecting the first direction and the second direction.

The high-resistivity layer 12 covers at least part of a surface of the sintered body 11.

The plurality of internal electrodes are disposed in the sintered body 11.

The plurality of external electrodes are disposed on the surface of the sintered body 11 and are electrically connected to the plurality of internal electrodes.

As shown in FIG. 4, the plurality of external electrodes include a first end face electrode 16, a second end face electrode 17, a first side face electrode 18, and a second side face electrode 19.

The first end face electrode 16 is disposed on the first end face S11 except for end portions of the first end face S11 in the second direction. The second end face electrode 17 is disposed on the second end face S12 except for end portions of the second end face S12 in the second direction. The first side face electrode 18 is disposed on the first side face S21 except for end portions of the first side face S21 in the first direction. The second side face electrode 19 is disposed on the second side face S22 except for end portions of the second side face S22 in the first direction.

In this embodiment, the "end portions" of the first end face S11 in the second direction is a boundary portion between the first end face S11 and the first side face S21 and a boundary portion between the first end face S11 and the second side face S22. Moreover, the "end portions" of the second end face S12 in the second direction 2 is a boundary portion between the second end face S12 and the first side face S21 and a boundary portion between the second end face S12 and the second side face S22. Further, the "end portions" of the first side face S21 in the first direction is a boundary portion between the first side face S21 and the first end face S11 and a boundary portion between the first side face S21 and the second end face S12. Furthermore, the "end portions" of the second side face S22 in the first direction is a boundary portion between the second side face S22 and the first end face S11 and a boundary portion between the second side face S22 and the second end face S12.

In the configuration described above, the distance between the plurality of external electrodes is increased compared to the case where the first end face electrode 16 is disposed on a portion including the end portions of the first end face S11 in the second direction (e.g., on a whole area of the first end face S11) and the second end face electrode 17 is disposed on a portion including the end portions of the second end face S12 in the second direction (e.g., on a whole area of the second end face S12). Specifically, the distance between the first end face electrode 16 and the first side face electrode 18, the distance between the first end face electrode 16 and the second side face electrode 19, the distance between the second end face electrode 17 and the first side face electrode 18, and the distance between the second end face electrode 17 and the second side face electrode 19 can be increased.

An example of the use of the multilayer varistor 1 of the present embodiment will be described below by way of an example.

Figure 3:
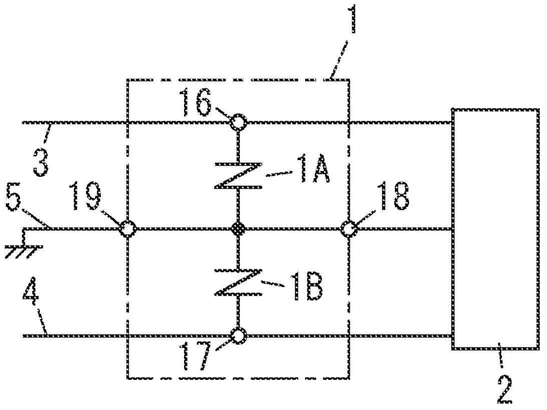
FIG. 3 is a circuit diagram illustrating an exemplary use of the multilayer varistor.

FIG. 3 is a circuit diagram of an exemplary use of the multilayer varistor 1 of the present embodiment. The circuit diagram of FIG. 3 shows the multilayer varistor 1 disposed in the vicinity of a communication IC 2 configured to perform communication based on a two-wire differential voltage transmission scheme. To the communication IC 2, lands of signal lines 3 and 4 and a land of a ground line 5 are connected. The first side face electrode 18 disposed on the first side face S21 and the second side face electrode 19 disposed on the second side face S22 are connected to the land of the ground line 5. The first end face electrode 16 disposed on the first end face S11 and the second end face electrode 17 disposed on the second end face S12 are respectively connected to the land of the signal line 3 and the land of the signal line 4. The multilayer varistor 1 includes a varistor (first varistor 1A) formed between the first end face electrode 16 and a set of the first side face electrode 18 and the second side face electrode 19, and a varistor (second varistor 1B) formed between the second end face electrode 17 and the set of the first side face electrode 18 and the second side face electrode 19. In such a circuit, for example, when static electricity is superposed on the signal line 3 and a voltage higher than a prescribed threshold voltage is thus applied to the first varistor 1A, the electric resistance of the first varistor 1A rapidly decreases, and a current flows through the first varistor 1A, and thereby, the communication IC 2 is protected. Note that the circuit shown in FIG. 3 is a mere example of a circuit to which the multilayer varistor 1 is applicable, and thus, the circuit may accordingly be modified.

In this embodiment, the electrostatic capacitance of the first varistor 1A includes: electrostatic capacitance between the internal electrode connected to the first end face electrode 16 and the internal electrode connected to the first side face electrode 18 and the second side face electrode 19; and a parasitic capacitance between the first end face electrode 16 and the set of the first side face electrode 18 and the second side face electrode 19. Moreover, the electrostatic capacitance of the second varistor 1B includes: electrostatic capacitance between the internal electrode connected to the second end face electrode 17 and the internal electrode connected to the first side face electrode 18 and the second side face electrode 19; and a parasitic capacitance between the second end face electrode 17 and the set of the first side face electrode 18 and the second side face electrode 19. In this case, the variation in the electrostatic capacitance between the first varistor 1A and the second varistor 1B affects a surge-absorbing property in the communication based on the two-wire differential voltage transmission scheme by the communication IC 2 and is thus desirably as small as possible. In the multilayer varistor 1 of the present embodiment, as described above, the distance between the first end face electrode 16 and the first side face electrode 18, the distance between the first end face electrode 16 and the second side face electrode 19, the distance between the second end face electrode 17 and the first side face electrode 18, and the distance between the second end face electrode 17 and the second side face electrode 19 are increased. This enables the parasitic capacitance between the first end face electrode 16 and the set of the first side face electrode 18 and the second side face electrode 19 to be reduced and the parasitic capacitance between the second end face electrode 17 and the set of the first side face electrode 18 and the second side face electrode 19 to be reduced, thereby reducing the variation in the electrostatic capacitance between the first varistor 1A and the second varistor 1B. That is, the configuration described above is suitable for a multilayer varistor having low electrostatic capacitance and being susceptible to the parasitic capacitance between a plurality of external electrodes and is suitable for a multilayer varistor having a small variation in the electrostatic capacitance between a plurality of varistors. This can also suppress the occurrence of migration between the plurality of external electrodes.

(2) Details

The multilayer varistor 1 of the present embodiment will be described below with reference to the drawings.

FIG. 1 is a phantom perspective view of the multilayer varistor 1. FIG. 2 is a sectional view of the multilayer varistor 1. FIG. 4 is a phantom top view of the multilayer varistor 1. In the present embodiment, the sintered body 11 excluding the plurality of external electrodes (the first end face electrode 16, the second end face electrode 17, the first side face electrode 18, and the second side face electrode 19) of the multilayer varistor 1 is in the shape of a rectangular parallelepiped having, for example, a length of 1.6 mm, a width of 0.8 mm, and a height of 0.8 mm. Note that in FIG. 1 and other figures, the outer shape of the sintered body 11 is shown in the form of a rectangular parallelepiped, but corners of the sintered body 11 may accordingly be beveled, or the corners of the sintered body 11 may be rounded.

In the following description, the long-side direction (left/right direction) of the sintered body 11 is defined as an "X-axis direction", the depth direction (forward/backward direction) of the sintered body 11 is defined as a "Y-axis direction", and the thickness direction (up/down direction) of the sintered body 11 is defined as a "Z-axis direction". An X axis, a Y axis, and a Z axis defining these directions are orthogonal to each other. Moreover, the positive direction of the X axis is defined as a right side, the positive direction of the Y axis is defined as a forward side, and the positive direction of the Z axis is defined as an upside. However, these directions are only examples and should not be construed as limiting the directions of the multilayer varistor 1 in use.

In addition, the arrows indicating the "X-axis direction", the "Y-axis direction", and the "Z-axis direction" on the drawings are just shown there as an assistant to description and are insubstantial ones.

In this embodiment, the X-axis direction is a direction in which the first end face S11 and the second end face S12 of the sintered body 11 are opposite to each other, and therefore, the X-axis direction corresponds to the "first direction". Further, the Y-axis direction is a direction in which the first side face S21 and the second side face S22 of the sintered body 11 are opposite to each other, and therefore, the Y-axis direction corresponds to the "second direction". Furthermore, the Z-axis direction is a direction in which the first main face S31 and the second main face S32 of the sintered body 11 are opposite to each other, and therefore, the Z-axis direction corresponds to the "third direction". In other words, the sintered body 11 has the first end face S11 and the second end face S12 opposite to each other in the first direction, the first side face S21 and the second side face S22 opposite to each other in the second direction, and the first main face S31 and the second main face S32 opposite to each other in the third direction as shown in FIGS. 2 and 4.

The sintered body 11 includes a semiconductor ceramic component having a non-linearity resistance characteristic. The sintered body 11, for example, includes ZnO as a major component, may include, as a minor component, at least one selected from the group consisting of $Bi_2O_3$, $Co_2O_3$, $MnO_2$, and $Sb_2O_3$, and may include at least one selected from the group consisting of $Pr_6O_{11}$, $Co_2O_3$, $CaCO_3$, and $Cr_2O_3$. In the sintered body 11, ZnO is sintered, and the other minor components are deposited on the grain boundary of ZnO particles. A grain boundary barrier formed between the ZnO particles expresses the non-linearity resistance characteristic. The sintered body 11 is formed, for example, by stacking four layers LY11 to LY14 (see FIG. 2) including ZnO as a major component on one another in the third direction and then sintering the four layers LY11 to LY14.

The surface of the sintered body 11 is covered with the high-resistivity layer 12 having a higher resistivity than the sintered body 11. Specifically, the high-resistivity layer 12 covers part of the surface of the sintered body 11 except for portions where, for example, the plurality of internal electrodes (the first internal electrode 13, the second internal electrode 14, and the third internal electrode 15) are exposed.

The high-resistivity layer 12 includes, for example, zinc silicate.

The plurality of external electrodes (the first end face electrode 16, the second end face electrode 17, the first side face electrode 18, and the second side face electrode 19) are disposed on the high-resistivity layer 12 on the surface of the sintered body 11. That is, the multilayer varistor 1 is a so-called four-terminal multilayer varistor.

The first end face electrode 16, the second end face electrode 17, the first side face electrode 18, and the second side face electrode 19 include, for example, silver (Ag). Conventionally, when the plurality of external electrodes include silver, migration is likely to occur between the plurality of external electrodes. However, the present embodiment can suppress the occurrence of the migration between the plurality of external electrodes. Therefore, the configuration of the present embodiment is also suitable for a multilayer varistor in which a plurality of external electrodes include silver.

The first end face electrode 16, the second end face electrode 17, the first side face electrode 18, and the second side face electrode 19 are formed in a forming step included in the method of manufacturing the multilayer varistor 1. Specifically, the first end face electrode 16, the second end face electrode 17, the first side face electrode 18, and the second side face electrode 19 are formed by applying, for example, a paste-like electrode material to the surface of the sintered body 11 with a roller in the forming step. Forming by application with a roller enables the dimensional accuracy of the plurality of external electrodes to be improved and the time required to form the plurality of external electrodes to be reduced as compared with a conventional method of, for example, dipping the sintered body 11 into an electrode material.

The first end face electrode 16 is disposed on the first end face S11 of the surface of the sintered body 11 except for the end portions of the first end face S11 in the second direction. Specifically, as shown in FIGS. 1, 2, and 4, the first end face electrode 16 has a first central portion C1 disposed on a central portion of the first end face S11 in the second direction. The first central portion C1 extends over both ends of the first end face S11 in the third direction. The first end face electrode 16 has first extending portions E1 disposed on the first main face S31 and on the second main face S32. Each first extending portion E1 extends in the first direction from a corresponding one of both end portions of the first central portion C1 in the third direction.

The second end face electrode 17 is disposed on the second end face S12 of the surface of the sintered body 11 except for the end portions of the second end face S12 in the second direction. Specifically, the second end face electrode 17 has a second central portion C2 disposed on a central portion of the second end face S12 in the second direction. The second central portion C2 extends over both ends of the second end face S12 in the third direction. The second end face electrode 17 has second extending portions E2 disposed on the first main face S31 and the second main face S32. Each second extending portion E2 extends in the first direction from a corresponding one of both end portions of the second central portion C2 in the third direction.

The first side face electrode 18 is disposed on the first side face S21 of the surface of the sintered body 11 except for the end portions of the first side face S21 in the first direction. Specifically, the first side face electrode 18 has a third central portion C3 disposed on a central portion of the first side face S21 in the first direction as shown in FIG. 1. The third central portion C3 extends over both ends of the first side face S21 in the third direction. As shown in FIG. 2, the first side face electrode 18 has third extending portions E3 disposed on the first main face S31 and on the second main face S32. Each third extending portion E3 extends in the second direction from a corresponding one of both end portions of the third central portion C3 in the third direction.

The second side face electrode 19 is disposed on the second side face S22 of the surface of the sintered body 11 except for the end portions of the second side face S22 in the first direction. Specifically, the second side face electrode 19 has a fourth central portion C4 disposed on a central portion of the second side face S22 in the first direction. As shown in FIG. 1, the fourth central portion C4 extends over both ends of the second side face S22 in the third direction. The second side face electrode 19 has fourth extending portions E4 disposed on the first main face S31 and on the second main face S32. Each fourth extending portion E4 extends in the second direction from a corresponding one of both end portions of the fourth central portion C4 in the third direction.

Here, as shown in FIG. 4, the width W1 of each first extending portion E1 in the second direction and the width W1 of each second extending portion E2 in the second direction are greater than the width W2 of each third extending portion E3 in the first direction and the width W2 of each fourth extending portion E4 in the first direction. The width W1 made greater than the width W2 can improve bonding strength to a substrate in the long-side direction (the first direction) of the multilayer varistor 1. Note that in the present embodiment, the width of each first extending portion E1 in the second direction and the width of each second extending portion E2 in the second direction are both the width W1, but the width of each first extending portion E1 in the second direction and the width of each second extending portion E2 in the second direction may be different. Moreover, in the present embodiment, the width of each third extending portion E3 in the first direction and the width of each fourth extending portion E4 in the first direction are both the width W2, but the width of each third extending portion E3 in the first direction and the width of each fourth extending portion E4 in the first direction may be different.

In addition, the width W3 of each first extending portion E1 in the first direction and the width W3 of each second extending portion E2 in the first direction are greater than the width W4 of each third extending portion E3 in the second direction and the width W4 of each fourth extending portion E4 in the second direction. The width W3 made greater than the width W4 can improve the bonding strength to the substrate in the long-side direction (the first direction) of the multilayer varistor 1. Note that in the present embodiment, the width of each first extending portion E1 in the first direction and the width of each second extending portion E2 in the first direction are both the width W3, but the width of each first extending portion E1 in the first direction and the width of each second extending portion E2 in the first direction may be different. Moreover, in the present embodiment, the width of each third extending portion E3 in the second direction and the width of each fourth extending portion E4 in the second direction are both the width W4, but the width of each third extending portion E3 in the second direction and the width of each fourth extending portion E4 in the second direction may be different.

With these configurations, the area of each of the first extending portions E1 and the second extending portions E2 viewed in the third direction is greater than the area of each of the third extending portions E3 and the fourth extending portions E4 viewed in the third direction as shown in FIG. 4. Here, the multilayer varistor 1 is mounted on the substrate by bonding the first extending portion E1, the second extending portion E2, the third extending portion E3, and the fourth extending portion E4 disposed on the second main face S32 to the substrate by a bonding material such as solder. Further, the multilayer varistor 1 is formed in the shape of a rectangular parallelepiped whose long-side direction is the first direction in which the first extending portions E1 faces the second extending portions E2. Therefore, when a thermal load is applied to the multilayer varistor 1 mounted on the substrate, greater stress is applied in the long-side direction. In this case, the area of each of the first extending portions E1 and the second extending portions E2 is greater than the area of each of the third extending portions E3 and the fourth extending portions E4 as explained above. Therefore, the bonding area of the bonding material is greater for each of the first extending portions E1 and the second extending portions E2 than for each of the third extending portions E3 and the fourth extending portions E4. Accordingly, the wetted area of the bonding material at the time of mounting on the substrate is made greater for each of the first extending portions E1 and the second extending portions E2 than for each of the third extending portions E3 and the fourth extending portions E4, thereby improving the bonding strength to the substrate in the long-side direction (the first direction) of the multilayer varistor 1.

Figure 5:
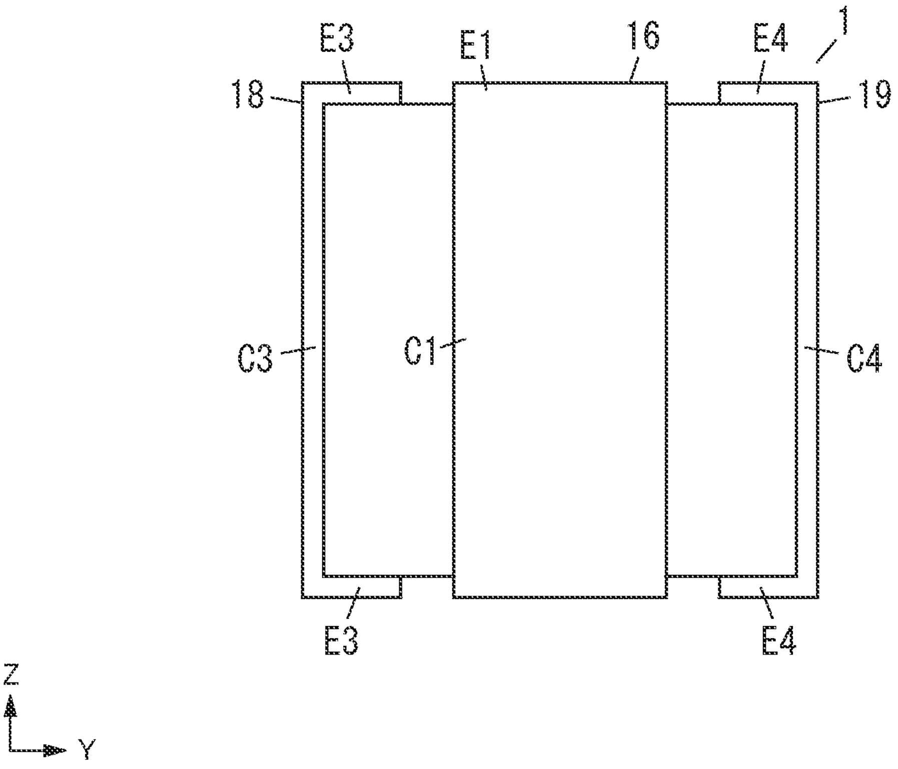
FIG. 5 is a side view of the multilayer varistor.
Figure 6:
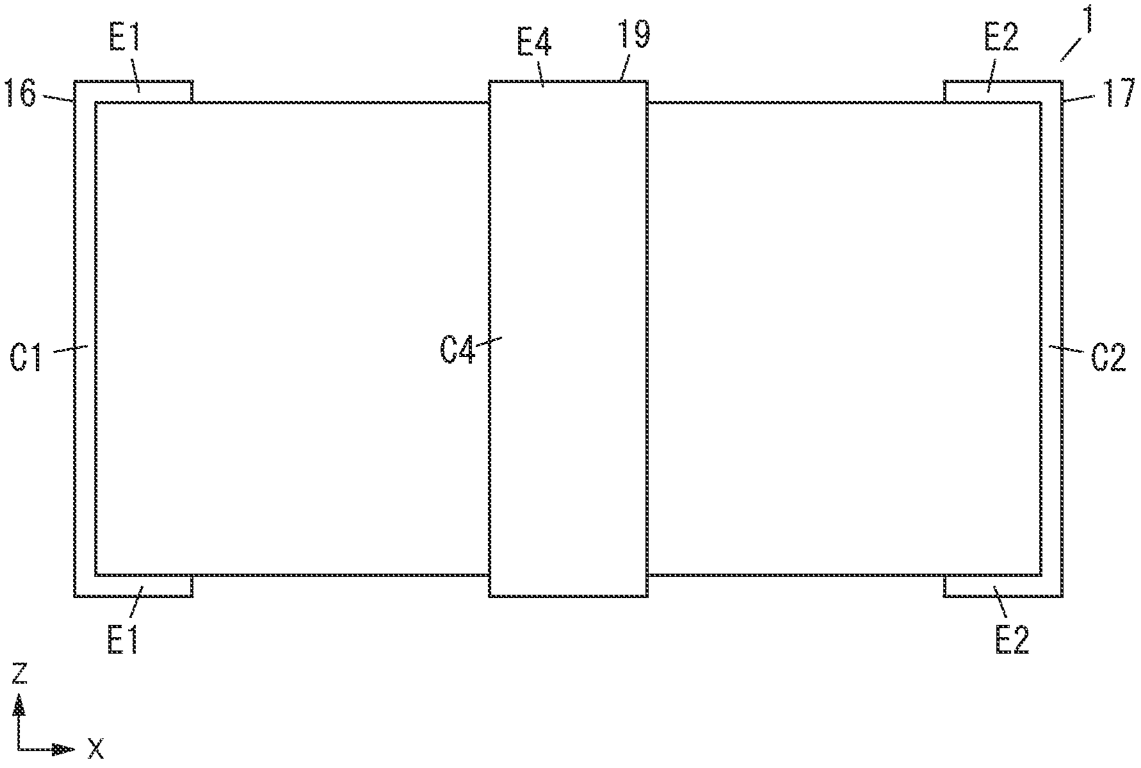
FIG. 6 is a front view of the multilayer varistor.

Moreover, as shown in FIG. 5, the third extending portions E3 and the fourth extending portions E4 are disposed so as not to overlap the first extending portions E1 and the second extending portions E2 when viewed in the first direction. In other words, as shown in FIG. 4, each third extending portion E3 is disposed on a backward side of an imaginary line L1 connecting rear ends of a corresponding one of the first extending portions E1 and a corresponding one of the second extending portions E2. Further, each fourth extending portion E4 is disposed on the forward side of an imaginary line L2 connecting front ends of a corresponding one of the first extending portions E1 and a corresponding one of the second extending portions E2. Furthermore, as shown in FIG. 6, the first extending portions E1 and the second extending portions E2 are disposed so as not to overlap the third extending portions E3 and the fourth extending portions E4 when viewed in the second direction. In other words, as shown in FIG. 4, each first extending portion E1 is provided on a left side of an imaginary line L3 connecting left ends of a corresponding one of the third extending portions E3 and a corresponding one of the fourth extending portions E4. Moreover, each second extending portion E2 is disposed on the right side of an imaginary line L4 connecting right ends of a corresponding one of the third extending portions E3 and a corresponding one of the fourth extending portions E4. These configurations enable the distance from each first extending portion E1 to a corresponding set of the third extending portion E3 and the fourth extending portion E4 to be increased. Moreover, these configurations enable the distance from each second extending portion E2 to a corresponding set of the third extending portion E3 and the fourth extending portion E4 to be increased. This can reduce the parasitic capacitance between each first extending portion E1 and the corresponding set of the third extending portion E3 and the fourth extending portion E4 and the parasitic capacitance between each second extending portion E2 and the corresponding set of the third extending portion E3 and the fourth extending portion E4, thereby reducing the variation in electrostatic capacitance between the first varistor 1A (see FIG. 3) and the second varistor 1B (see FIG. 3).

In the sintered body 11, the plurality of internal electrodes (the first internal electrode 13, the second internal electrode 14, and the third internal electrode 15) are disposed as shown in FIGS. 1, 2 and 4.

Here, as described above, the sintered body 11 includes the four layers LY11 to LY14 (see FIG. 2) stacked on one another in the third direction, and the first internal electrode 13 is disposed, for example, on an upper surface (hereinafter also referred to as a first stacking surface SF1) of the layer LY13. The second internal electrode 14 is disposed, for example, on an upper surface (hereinafter also referred to as a second stacking surface SF2) of the layer LY11. The third internal electrode 15 is disposed, for example, on an upper surface (hereinafter also referred to as a third stacking surface SF3) of the layer LY12. In other words, the first internal electrode 13 is disposed on the first stacking surface SF1, the second internal electrode 14 is disposed on the second stacking surface SF2 different from the first stacking surface SF1, and the third internal electrode 15 is disposed on the third stacking surface SF3 different from the first stacking surface SF1 and the second stacking surface SF2. Thus, in the third direction (up/down direction), the third internal electrode 15 is disposed between the first internal electrode 13 and the second internal electrode 14.

The first internal electrode 13 includes a first facing part F1 and a first lead-out part B1. The first lead-out part B1 is narrower than the first facing part F1 in the second direction and protrudes leftward from the first facing part F1 along the first direction. The first lead-out part B1 has a left end electrically connected to the first central portion C1 of the first end face electrode 16.

The second internal electrode 14 includes a second facing part F2 and a second lead-out part B2. The second lead-out part B2 is narrower than the second facing part F2 in the second direction and protrudes rightward from the second facing part F2 along the first direction. The second lead-out part B2 has a right end electrically connected to the second central portion C2 of the second end face electrode 17.

The third internal electrode 15 includes a third facing part F3 and two third lead-out parts B3. The two third lead-out parts B3 are each narrower than the third facing part F3 in the first direction and protrude from the third facing part F3 in the forward/backward direction along the second direction. The third lead-out part B3 protruding backward is electrically connected to the third central portion C3 of the first side face electrode 18 disposed on the first side face S21. The third lead-out part B3 protruding forward is electrically connected to the fourth central portion C4 of the second side face electrode 19 disposed on the second side face S22.

The first facing part F1 of the first internal electrode 13 has electrostatic capacitance between the first facing part F1 and the third facing part F3 of the third internal electrode 15. The first facing part F1 faces the third facing part F3 in the third direction.

A parasitic capacitance is generated between the third internal electrode 15 and the first end face electrode 16 connected to the first lead-out part B1 of the first internal electrode 13. In this case, in order to reduce the parasitic capacitance between the first end face electrode 16 and the third internal electrode 15, the first extending portions E1 of the first end face electrode 16 are disposed so as not to overlap the third internal electrode 15 when viewed in the third direction as shown in FIG. 4.

A parasitic capacitance is also generated between the first internal electrode 13 and the set of the first side face electrode 18 and the second side face electrode 19 connected to the two respective third lead-out parts B3 of the third internal electrode 15. In this case, in order to reduce the parasitic capacitance between the first internal electrode 13 and the set of the first side face electrode 18 and the second side face electrode 19, the third extending portions E3 of the first side face electrode 18 and the fourth extending portions E4 of the second side face electrode 19 are disposed so as not to overlap the first internal electrode 13 when viewed in the third direction.

The second facing part F2 of the second internal electrode 14 has electrostatic capacitance between the second facing part F2 and the third facing part F3 of the third internal electrode 15. The second facing part F2 faces the third facing part F3 in the third direction.

A parasitic capacitance is generated between the third internal electrode 15 and the second end face electrode 17 connected to the second lead-out part B2 of the second internal electrode 14. In this case, in order to reduce the parasitic capacitance between the second end face electrode 17 and the third internal electrode 15, the second extending portions E2 of the second end face electrode 17 are disposed so as not to overlap the third internal electrode 15 when viewed in the third direction as shown in FIG. 4.

A parasitic capacitance is also generated between the second internal electrode 14 and the set of the first side face electrode 18 and the second side face electrode 19 connected to the two respective third lead-out parts B3 of the third internal electrode 15. In this case, in order to reduce the parasitic capacitance between the second internal electrode 14 and the set of the first side face electrode 18 and the second side face electrode 19, the third extending portions E3 of the first side face electrode 18 and the fourth extending portions E4 of the second side face electrode 19 are disposed so as not to overlap the second internal electrode 14 when viewed in the third direction.

(3) Variations

Variations of the multilayer varistor of the present disclosure will be described below.

The embodiment described above includes one layer including the first internal electrode 13 and the third internal electrode 15 facing each other and one layer including the second internal electrode 14 and the third internal electrode 15 facing each other. Alternatively, however, a plurality of layers each including the first internal electrode 13 and the third internal electrode 15 facing each other and a plurality of layers each including the second internal electrode 14 and the third internal electrode 15 facing each other may be provided.

In the embodiment described above, the sintered body 11 includes the four layers LY11 to LY14 stacked on one another, but the sintered body 11 is not limited to having a laminated structure of the four layers. The sintered body 11 has a laminated structure of at least two layers.

Figure 7:
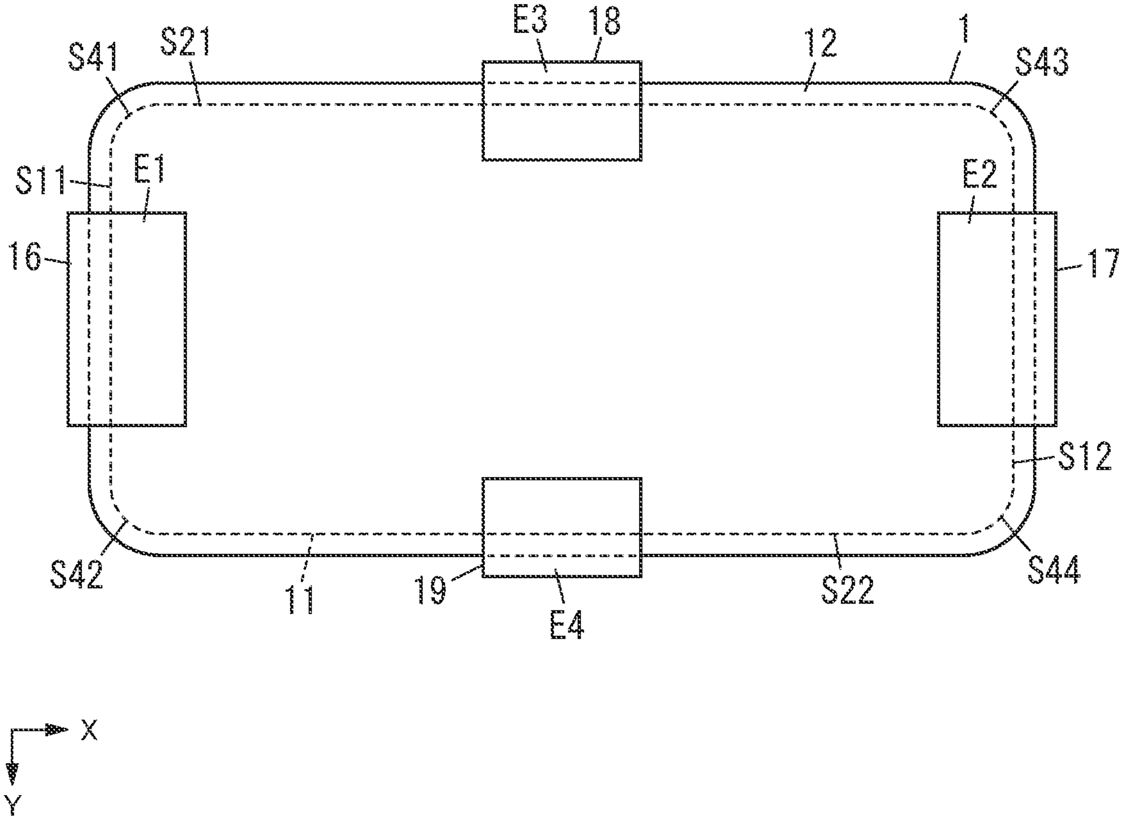
FIG. 7 is a top view of a multilayer varistor of a variation.

In the embodiment described above, the first end face S11 is directly connected to the first side face S21 and the second side face S22, and the second end face S12 is directly connected to the first side face S21 and the second side face S22. However, in the multilayer varistor 1, as shown in FIG. 7, the sintered body 11 may have: a first connection face S41 connecting the first end face S11 and the first side face S21 to each other; a second connection face S42 connecting the first end face S11 and the second side face S22 to each other; a third connection face S43 connecting the second end face S12 and the first side face S21 to each other; and a fourth connection face S44 connecting the second end face S12 and the second side face S22 to each other. Each of the first connection face S41 to the fourth connection face S44 includes, for example, a curved surface. In this case, the first end face electrode 16 is disposed on the first end face S11 except for the first connection face S41 and the second connection face S42, and the second end face electrode 17 is disposed on the second end face S12 except for the third connection face S43 and the fourth connection face S44. The first side face electrode 18 is disposed on the first side face S21 except for the first connection face S41 and the third connection face S43, and the second side face electrode 19 is disposed on the second side face S22 except for the second connection face S42 and the fourth connection face S44. Note that each of the first connection face S41 to the fourth connection face S44 may be a flat face.

(4) Summary

As described above, a multilayer varistor (1) of a first aspect includes a sintered body (11), a high-resistivity layer (12), and a plurality of internal electrodes, and a plurality of external electrodes. The sintered body (11) has a first end face (S11) and a second end face (S12) opposite to each other in a first direction, a first side face (S21) and a second side face (S22) opposite to each other in a second direction intersecting the first direction, and a first main face (S31) and a second main face (S32) opposite to each other in a third direction intersecting the first direction and the second direction. The high-resistivity layer (12) covers at least part of a surface of the sintered body (11). The plurality of internal electrodes are disposed in the sintered body (11). The plurality of external electrodes are disposed on the surface of the sintered body (11) and are electrically connected to the plurality of internal electrodes. The plurality of external electrodes includes a first end face electrode (16), a second end face electrode (17), a first side face electrode (18), and a second side face electrode (19). The first end face electrode (16) is disposed on the first end face (S11) except for end portions of the first end face (S11) in the second direction. The second end face electrode (17) is disposed on the second end face (S12) except for end portions of the second end face (S12) in the second direction. The first side face electrode (18) is disposed on the first side face (S21) except for end portions of the first side face (S21) in the first direction. The second side face electrode (19) is disposed on the second side face (S22) except for end portions of the second side face (S22) in the first direction.

This aspect enables a parasitic capacitance between the first end face electrode (16) and a set of the first side face electrode (18) and the second side face electrode (19) to be reduced and a parasitic capacitance between the second end face electrode (17) and the set of the first side face electrode (18) and the second side face electrode (19) to be reduced, thereby reducing variations in electrostatic capacitance between the first varistor (1A) and the second varistor (1B).

In a multilayer varistor (1) of a second aspect referring to the first aspect, the sintered body (11) has a first connection face (S41) connecting the first end face (S11) and the first side face (S21) to each other, a second connection face (S42) connecting the first end face (S11) and the second side face (S22) to each other, a third connection face (S43) connecting the second end face (S12) and the first side face (S21) to each other, and a fourth connection face (S44) connecting the second end face (S12) and the second side face (S22) to each other. The first end face electrode (16) is disposed on the first end face (S11) except for the first connection face (S41) and the second connection face (S42). The second end face electrode (17) is disposed on the second end face (S12) except for the third connection face (S43) and the fourth connection face (S44). The first side face electrode (18) is disposed on the first side face (S21) except for the first connection face (S41) and the third connection face (S43). The second side face electrode (19) is disposed on the second side face (S22) except for the second connection face (S42) and the fourth connection face (S44).

This aspect enables the parasitic capacitance between the first end face electrode (16) and the set of the first side face electrode (18) and the second side face electrode (19) to be reduced and the parasitic capacitance between the second end face electrode (17) and the set of the first side face electrode (18) and the second side face electrode (19) to be reduced, thereby reducing the variations in the electrostatic capacitance between the first varistor (1A) and the second varistor (1B).

In a multilayer varistor (1) of a third aspect referring to the first or second aspect, the first end face electrode (16) includes first extending portions (E1) disposed on the first main face (S31) and on the second main face (S32). The second end face electrode (17) includes second extending portions (E2) disposed on the first main face (S31) and on the second main face (S32). The first side face electrode (18) includes third extending portions (E3) disposed on the first main face (S31) and on the second main face (S32). The second side face electrode (19) includes fourth extending portions (E4) disposed on the first main face (S31) and on the second main face (S32). The third extending portions (E3) and the fourth extending portions (E4) are disposed so as not to overlap the first extending portions (E1) and the second extending portions (E2) when viewed in the first direction.

This aspect enables the parasitic capacitance between the first end face electrode (16) and the set of the first side face electrode (18) and the second side face electrode (19) to be reduced and the parasitic capacitance between the second end face electrode (17) and the set of the first side face electrode (18) and the second side face electrode (19) to be reduced, thereby reducing the variations in the electrostatic capacitance between the first varistor (1A) and the second varistor (1B).

In a multilayer varistor (1) of a fourth aspect referring to the third aspect, a width (W1) of each of the first extending portions (E1) in the second direction is greater than a width (W2) of each of the third extending portions (E3) in the first direction, the width (W1) of each of the first extending portions (E1) in the second direction is greater than a width (W2) of each of the fourth extending portions (E4) in the first direction, a width (W1) of each of the second extending portions (E2) in the second direction is greater than the width (W2) of each of the third extending portions (E3) in the first direction, and the width (W1) of each of the second extending portions (E2) in the second direction is greater than the width (W2) of each of the fourth extending portions (E4) in the first direction.

This aspect enables bonding strength to a substrate in the first direction of the multilayer varistor (1) to be improved.

In a multilayer varistor (1) of a fifth aspect referring to the third or fourth aspect, a width (W3) of each of the first extending portions (E1) in the first direction is greater than a width (W4) of each of the third extending portions (E3) in the second direction, the width (W3) of each of the first extending portions (E1) in the first direction is greater than a width (W4) of each of the fourth extending portions (E4) in the second direction, a width (W3) of each of the second extending portions (E2) in the first direction is greater than the width (W4) of each of the third extending portions (E3) in the second direction, and the width (W3) of each of the second extending portions (E2) in the first direction is greater than the width (W4) of each of the fourth extending portions (E4) in the second direction.

This aspect enables the bonding strength to the substrate in the first direction of the multilayer varistor (1) to be improved.

In a multilayer varistor (1) of a sixth aspect referring to any one of the third to fifth aspects, the first extending portions (E1) and the second extending portions (E2) are disposed so as not to overlap the third extending portions (E3) and the fourth extending portions (E4) when viewed in the second direction.

This aspect enables the parasitic capacitance between the first end face electrode (16) and the set of the first side face electrode (18) and the second side face electrode (19) to be reduced and the parasitic capacitance between the second end face electrode (17) and the set of the first side face electrode (18) and the second side face electrode (19) to be reduced, thereby reducing the variations in the electrostatic capacitance between the first varistor (1A) and the second varistor (1B).

In a multilayer varistor (1) of a seventh aspect referring to any one of the third to sixth aspects, the first end face electrode (16), the second end face electrode (17), the first side face electrode (18), and the second side face electrode (19) include silver.

This aspect enables the electrical conductivity of the first end face electrode (16), the second end face electrode (17), the first side face electrode (18), and the second side face electrode (19) to be improved. Further, when the first end face electrode (16), the second end face electrode (17), the first side face electrode (18), and the second side face electrode (19) include silver, migration of silver tends to occur, but the occurrence of the migration can be suppressed by reducing a parasitic capacitance between the external electrodes.

In a multilayer varistor (1) of an eighth aspect referring to any one of the third to seventh aspects, the plurality of internal electrodes includes a first internal electrode (13) electrically connected to the first end face electrode (16), a second internal electrode (14) electrically connected to the second end face electrode (17), and a third internal electrode (15) electrically connected to the first side face electrode (18) and the second side face electrode (19). The third internal electrode (15) is disposed between the first internal electrode (13) and the second internal electrode (14) in the third direction.

This aspect enables the multilayer varistor (1) to be downsized.

In a multilayer varistor (1) of a ninth aspect referring to the eighth aspect, the first extending portions (E1) and the second extending portions (E2) are disposed so as not to overlap the third internal electrode (15) when viewed in the third direction.

This aspect enables a parasitic capacitance between the first end face electrode (16) and the third internal electrode (15) and a parasitic capacitance between the second end face electrode (17) and the third internal electrode (15) to be reduced.

In a multilayer varistor (1) of a tenth aspect referring to the eighth or ninth aspect, the third extending portions (E3) and the fourth extending portions (E4) are disposed so as not to overlap the first internal electrode (13) and the second internal electrode (14) when viewed in the third direction.

This aspect enables a parasitic capacitance between the first internal electrode (13) and the set of the first side face electrode (18) and the second side face electrode (19) to be reduced and a parasitic capacitance between the second internal electrode (14) and the set of the first side face electrode (18) and the second side face electrode (19) to be reduced.

A manufacturing method of an eleventh aspect is a method of manufacturing the multilayer varistor (1) of any one of the first to tenth aspects. The method includes a forming step of forming the first end face electrode (16), the second end face electrode (17), the first side face electrode (18), and the second side face electrode (19). The forming step includes applying an electrode material to the surface of the sintered body (11) with a roller to form the first end face electrode (16), the second end face electrode (17), the first side face electrode (18), and the second side face electrode (19).

This aspect enables the dimensional accuracy of the first end face electrode (16), the second end face electrode (17), the first side face electrode (18), and the second side face electrode (19) to be improved and the time required to form the first end face electrode (16), the second end face electrode (17), the first side face electrode (18), and the second side face electrode (19) to be reduced.

Note that the second to tenth aspects are not configurations essential for the multilayer varistor (1) and may be omitted as appropriate.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

The invention claimed is:

1. A multilayer varistor comprising:

a sintered body;

a high-resistivity layer covering at least part of a surface of the sintered body;

a plurality of internal electrodes disposed in the sintered body; and a plurality of external electrodes disposed on the surface of the sintered body and electrically connected to the plurality of internal electrodes;

the sintered body having:

a first end face and a second end face opposite to each other in a first direction, a first side face and a second side face opposite to each other in a second direction intersecting the first direction, and a first main face and a second main face opposite to each other in a third direction intersecting the first direction and the second direction, the plurality of external electrodes including:

a first end face electrode disposed on the first end face except for end portions of the first end face in the second direction, a second end face electrode disposed on the second end face except for end portions of the second end face in the second direction, a first side face electrode disposed on the first side face except for end portions of the first side face in the first direction, and a second side face electrode disposed on the second side face except for end portions of the second side face in the first direction, the first end face electrode including first extending portions disposed on the first main face and on the second main face, the second end face electrode including second extending portions disposed on the first main face and on the second main face, the first side face electrode including third extending portions disposed on the first main face and on the second main face, the second side face electrode including fourth extending portions disposed on the first main face and on the second main face, the third extending portions and the fourth extending portions being disposed so as not to overlap the first extending portions and the second extending portions when viewed in the first direction, a width of each of the first extending portions in the first direction being greater than a width of each of the third extending portions in the second direction, the width of each of the first extending portions in the first direction being greater than a width of each of the fourth extending portions in the second direction, a width of each of the second extending portions in the first direction being greater than the width of each of the third extending portions in the second direction, and the width of each of the second extending portions in the first direction being greater than the width of each of the fourth extending portions in the second direction.

2. The multilayer varistor of claim 1, wherein the sintered body has:

a first connection face connecting the first end face and the first side face to each other, a second connection face connecting the first end face and the second side face to each other, a third connection face connecting the second end face and the first side face to each other, and a fourth connection face connecting the second end face and the second side face to each other, the first end face electrode is disposed on the first end face except for the first connection face and the second connection face, the second end face electrode is disposed on the second end face except for the third connection face and the fourth connection face, the first side face electrode is disposed on the first side face except for the first connection face and the third connection face, and the second side face electrode is disposed on the second side face except for the second connection face and the fourth connection face.

3. The multilayer varistor of claim 1, wherein a width of each of the first extending portions in the second direction is greater than a width of each of the third extending portions in the first direction, the width of each of the first extending portions in the second direction is greater than a width of each of the fourth extending portions in the first direction, a width of each of the second extending portions in the second direction is greater than the width of each of the third extending portions in the first direction, and the width of each of the second extending portions in the second direction is greater than the width of each of the fourth extending portions in the first direction.

4. The multilayer varistor of claim 3, wherein the first extending portions and the second extending portions are disposed so as not to overlap the third extending portions and the fourth extending portions when viewed in the second direction.

5. The multilayer varistor of claim 3, wherein the first end face electrode, the second end face electrode, the first side face electrode, and the second side face electrode include silver.

6. The multilayer varistor of claim 3, wherein the plurality of internal electrodes includes:

a first internal electrode electrically connected to the first end face electrode, a second internal electrode electrically connected to the second end face electrode, and a third internal electrode electrically connected to the first side face electrode and the second side face electrode, and the third internal electrode is disposed between the first internal electrode and the second internal electrode in the third direction.

7. The multilayer varistor of claim 1, wherein the first extending portions and the second extending portions are disposed so as not to overlap the third extending portions and the fourth extending portions when viewed in the second direction.

8. The multilayer varistor of claim 7, wherein the first end face electrode, the second end face electrode, the first side face electrode, and the second side face electrode include silver.

9. The multilayer varistor of claim 1, wherein the first end face electrode, the second end face electrode, the first side face electrode, and the second side face electrode include silver.

10. The multilayer varistor of claim 1, wherein the plurality of internal electrodes includes:

a first internal electrode electrically connected to the first end face electrode, a second internal electrode electrically connected to the second end face electrode, and a third internal electrode electrically connected to the first side face electrode and the second side face electrode, and the third internal electrode is disposed between the first internal electrode and the second internal electrode in the third direction.

11. The multilayer varistor of claim 10, wherein the first extending portions and the second extending portions are disposed so as not to overlap the third internal electrode when viewed in the third direction.

12. The multilayer varistor of claim 10, wherein the third extending portions and the fourth extending portions are disposed so as not to overlap the first internal electrode and the second internal electrode when viewed in the third direction.

13. A method of manufacturing the multilayer varistor of claim 1, the method comprising a forming step of forming the first end face electrode, the second end face electrode, the first side face electrode, and the second side face electrode, the forming step including applying an electrode material to the surface of the sintered body with a roller to form the first end face electrode, the second end face electrode, the first side face electrode, and the second side face electrode.

* * * * *